United States Patent [19]

Furukawa et al.

[11] 4,412,594

[45] Nov. 1, 1983

[54] STEERING SYSTEM FOR MOTOR VEHICLES

[75] Inventors: Yoshimi Furukawa, Tokyo; Shoichi Sano, Tokorozawa, both of Japan

[73] Assignee: Honda Giken Kogyo Kabushiki Kaisha, Tokyo, Japan

[21] Appl. No.: 296,070

[22] Filed: Aug. 25, 1981

[30] Foreign Application Priority Data

Aug. 27, 1980 [JP] Japan .............................. 55-118101
Sep. 2, 1980 [JP] Japan .............................. 55-121586
Oct. 20, 1980 [JP] Japan .............................. 55-146571

[51] Int. Cl.³ ............................................. B62D 5/06
[52] U.S. Cl. ..................................... 180/140; 180/142
[58] Field of Search ................ 180/140, 141, 142, 143

[56] References Cited

U.S. PATENT DOCUMENTS 3,939,938 2/1976 Inoue .................................... 180/142
4,071,109 1/1978 Ezoe ..................................... 180/143
4,175,638 11/1979 Christensen .......................... 180/140

*Primary Examiner*—John A. Pekar
*Assistant Examiner*—D. Lynn Fugate
*Attorney, Agent, or Firm*—Irving M. Weiner; Pamela S. Burt; John L. Shortley

[57] ABSTRACT

A motor vehicle steering system for steering rearward wheels as well as forward wheels. The steering system includes a sensor for sensing at least a turning motion of the motor vehicle, a computer for processing signals from the sensor, and an actuator controllable by the computer for steering the rearward wheels in order to meet driving conditions of the vehicle while turning, as much as possible. The sensor may comprise a lateral acceleration or yaw angular velocity sensor, or a combination of a steering angle sensor and a lateral acceleration or yaw angular velocity sensor, or a combination of a steering angle sensor and an acceleration and deceleration sensor, or the like. A steered angle ratio $\gamma$ of the rearward wheels to forward wheels is selected to be in the range of $0 < \gamma \leq 0.6$ when the vehicle is moving at a speed of 80 km/h or higher.

7 Claims, 8 Drawing Figures

STEERING SYSTEM FOR MOTOR VEHICLES

BACKGROUND OF THE INVENTION

1. Field of the Invention

The present invention relates to a vehicular steering system for steering rearward wheels as well as forward wheels, and more particularly to a steering system for steering rearward wheels of a motor vehicle under electronic control.

2. Description of the Prior Art

Conventional motor vehicles include a forward wheel 30, as shown in FIG. 7 of the accompanying drawings, which is dirigible by the rotation of a steering wheel. When the steering wheel starts being rotated, the forward wheel 30 is turned to form a slip angle $\alpha_1$ with respect to the longitudinal axis of the vehicle and to produce a lateral force $F_1$, thus initiating turning movement of the vehicle. At this time, there is generated a lateral acceleration a, or a yaw rate (yaw angular velocity) produced by a yawing motion of the vehicle about a vertical axis at the center of gravity of the vehicle. Then, the vehicle starts turning, whereupon a rearward wheel 31 forms a slip angle $\alpha_2$ with respect to the longitudinal axis of the vehicle and is subjected to a lateral force $F_2$ (FIG. 8), increasing the lateral acceleration a. With such a motor vehicle wherein only the forward wheel is dirigible, generation of the lateral force at the rearward wheel is delayed from that of the lateral force at the forward wheel, thus resulting in a time delay before the rearward wheel 31 is involved in the turning motion of the vehicle. Such a delay in the response of the rearward wheel becomes greater as the vehicle speed increases since the turning angle of the vehicle and the maximum slip angle $\alpha_2$ of the rearward wheel 31 becomes larger with higher vehicle speeds at the same steering angle. Due to such a response delay of the rearward wheel which increases as the vehicle speed increases, there is a tendency for the prior vehicle to fail in quickly following the driver's steering action.

To cope with the response delay of the rearward wheel, there has been proposed a steering system for steering rearward wheels as well as forward wheels. With such a steering system installed on a motor vehicle, rearward wheels are mechanically interlinked to forward wheels for their steered motion. There is a need, however, to control the rearward wheels so as to meet driving conditions of the vehicle during a turning motion.

When a vehicle is accelerated or decelerated, turning characteristics thereof are different from those of the vehicle as it turns at a constant speed even if their speeds of travel are the same as a certain point of time. More specifically, as the vehicle is accelerated or decelerated, distribution of the vehicle load on forward and rearward wheels changes to thus cause forward and rearward suspensions to move upwardly and downwardly in strokes thereof, resulting in changes in over or under steering and camber at the forward and rearward wheels. Thus, when the vehicle is accelerated or decelerated while driving in a normal circular motion, the radius of turning motion of the vehicle changes. For example, when accelerated while being turned, a front-wheel-driven vehicle will turn along a curve having a larger radius of curvature than that of the curve followed by the vehicle turning at a constant speed, and conversely a rear-wheel-driven vehicle will turn along a curve having a smaller radius of curvature. Maneuverability and stability of vehicles having dirigible forward and rearward wheels can be improved by reducing changes in the turning characteristics which would be produced when the vehicle is accelerated and decelerated while in a turning motion. It is also desirable in such vehicles to select a steered angle ratio between forward and rearward wheels so as to allow the driver to have a better steering feeling.

SUMMARY OF THE INVENTION

According to the present invention, a steering system for a motor vehicle having rearward wheels comprises a sensor for sensing at least a turning motion of the vehicle, and drive means responsive to a signal from the sensor for steering the rearward wheels. The sensor may comprise a sensor for sensing a lateral acceleration or yaw angular velocity, or a combination of a steering angle sensor and a sensor for sensing a lateral acceleration or yaw angular velocity. The sensor may also comprise a combination of a steering angle sensor and an acceleration and deceleration sensor, or may comprise such a combination combined with a vehicle speed sensor and/or a sensor for sensing a lateral acceleration or yaw angular velocity. The drive means comprises a computer for processing signals from the sensor and an actuator controllable by the computer. For a vehicle speed of 80 km/h or higher, the steered angle ratio $\gamma$ of the rearward wheels to the forward wheels should be in the range of $0 < \gamma \leq 0.6$.

It is an object of the present invention to provide a vehicular steering system for steering rearward wheels so as to meet driving conditions of the vehicle during a turning motion.

Another object of the present invention is to provide a vehicular steering system for reducing changes in turning characteristics of the vehicle when the latter is accelerated or decelerated while being turned.

Still another object of the present invention is to provide a vehicular steering system for selecting a steering ratio between forward and rearward wheels so as to allow the driver to have a better steering feeling.

The above and other objects and advantages of the present invention will become apparent from the following description when taken in conjunction with the accompanying drawings which illustrate some preferred embodiments of the present invention by way of example.

DETAILED DESCRIPTION OF PREFERRED EMBODIMENTS

Figure 1:
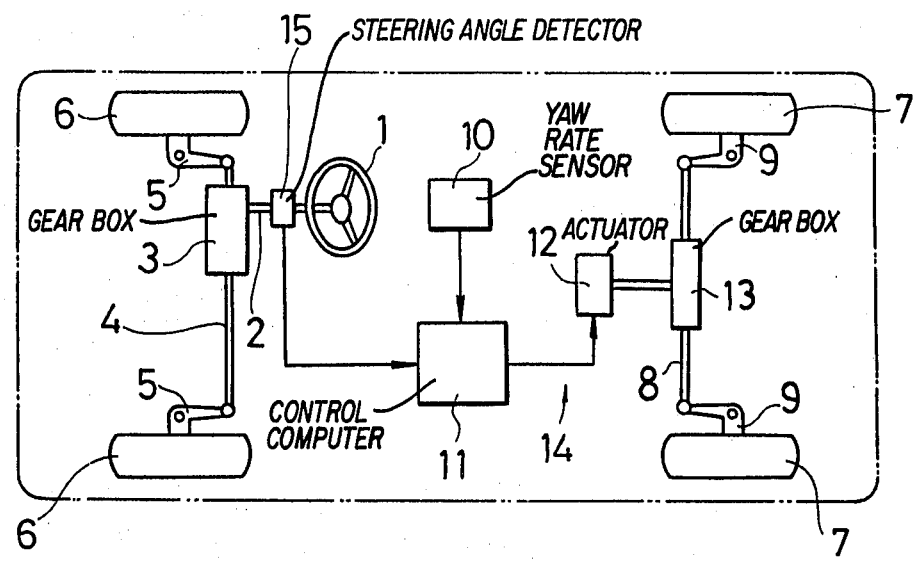
FIG. 1 is a schematic plan view of a motor vehicle equipped with a steering system according to the present invention.

In FIG. 1, steering power from a steering wheel 1 of a motor vehicle is transmitted through a steering column 2 to a gear box 3 which comprises a suitable motion conversion mechanism such as a rack and pinion for converting rotary motion of the steering wheel 1 to rectilinear motion of a tie rod 4. A pair of knuckle arms 5, 5 pivotably coupled to the ends of the tie rod 4 are angularly movable about pivot pins 5a, 5a to effect steering control of a pair of forward wheels 6, 6. A pair of rearward wheels 7, 7 are steerable by rectilinear movement of a tie rod 8 connected thereto by a pair of respective knuckle arms 9, 9 pivotable about pivot pins 9a, 9a.

The motor vehicle is equipped with a sensor 10 for sensing a lateral acceleration or a yaw rate, the latter being generated by yawing motion of the vehicle about a vertical axis at the center of gravity of the vehicle when the vehicle is turned, a control computer 11, and a servo actuator 12 such as a motor, the actuator 12 being connected to a gear box 13 having therein a motion conversion mechanism such as a rack and pinion coupled to the tie rod 8. The computer 11, actuator 12 and gear box 13 jointly constitute a drive means 14 for steering the rearward wheels 7, 7.

When the steering wheel 1 is turned while the vehicle is moving, the vehicle is subjected to a lateral acceleration or a yaw rate (yaw angular velocity) depending on the direction in which the vehicle is turned. Such a lateral acceleration or a yaw rate is sensed by the sensor 10 which produces an electric signal that is supplied to the computer 11 for controlling the actuator 12. The actuator 12 then actuates the tie rod 8 which causes the knuckle arms 9, 9 to pivot about the pivot pins 9a, 9a, respectively. Thus, the rearward wheels 7, 7 are steered in response to the produced lateral acceleration or yaw rate which is processed by the computer 11.

The computer 11 is so programmed as to meet the equation $\delta r = ka$, where $a$ is the lateral acceleration, $\delta r$ is the steered angle of the rearward wheels, and $k$ is a proportional constant which is a function of the vehicle speed since a delay in the response of the rearward wheels to steered motion of the forward wheels when the vehicle is in a turning motion becomes greater as the vehicle speed increases. The proportional constant $k$ which is a function of vehicle speed should therefore be selected to be a value close to zero when the vehicle is running at a low speed, and to become larger as the vehicle speed becomes higher, this being effected by supplying information from a vehicle speed sensor to the computer.

Figure 3:
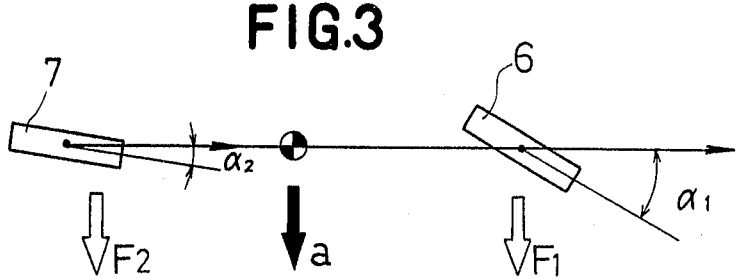
FIG. 3 is a view showing slip angles and lateral forces generated at forward and rearward wheels and a lateral acceleration at the center of gravity of a motor vehicle having the system of the present invention when the vehicle starts turning.
Figure 4:
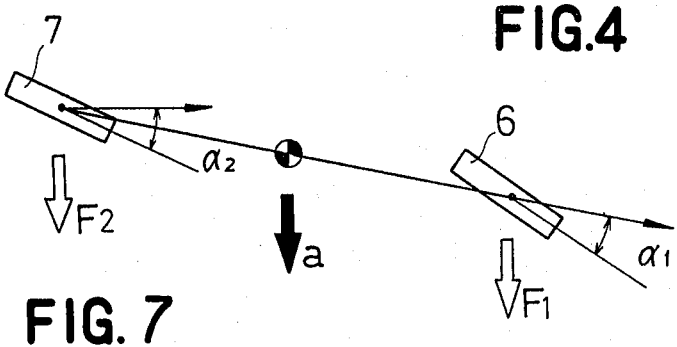
FIG. 4 is a view similar to FIG. 3, showing a condition experienced when the vehicle is further turned.
Figure 7:
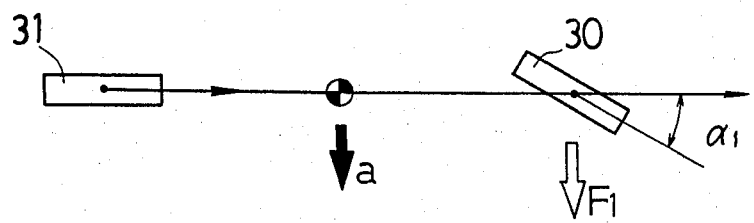
FIGS. 7 and 8 are views similar to FIGS. 3 and 4, showing a conventional vehicle with only the forward wheels thereof being steerable.
Figure 8:
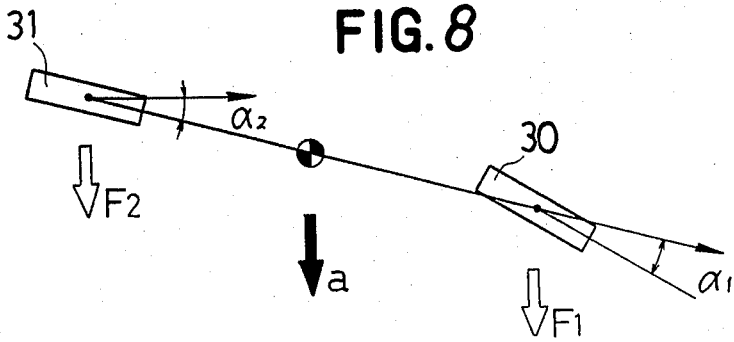

As shown in FIG. 3, when a slip angle $\alpha_1$ and a lateral force $F_1$ are produced at the forward wheel 6 and the vehicle is subjected to a lateral acceleration $a$ at an initial stage of turning movement of the vehicle, a slip angle $\alpha_2$ and a lateral force $F_2$ are immediately produced at the rearward wheel 7. Thus, responsiveness of the rearward wheels is greatly improved with the lateral acceleration $a$ increased. As the vehicle is further turned, the rearward wheel 7 is further steered as shown in FIG. 4. Therefore, a normal circular motion will be gained in a short period of time since the slip angle $\alpha_2$ at the rearward wheel 7 increases rapidly.

When the vehicle is subjected to a lateral force such as due to a lateral wind while the vehicle is moving in a straight direction, the sensor senses a lateral acceleration of the vehicle produced by the applied lateral force to steer the rearward wheels in a direction to cancel the lateral force, to thereby automatically maintain the vehicle in a constant straight path.

As also shown in FIG. 1, a steering angle detector 15 such as a potentiometer is mounted on the steering column 2. The detector 15 detects an angle through which the steering wheel 1 has turned and produces a signal which is supplied to the computer 11. Thus, the rearward wheels 7, 7 can be steered together with steered motion of the forward wheels 6, 6. The delay in response of the rearward wheels 7, 7 to the forward wheels 6, 6 can be more improved if the steered angle of the rearward wheel $\delta r = h\delta f + ka$ where $\delta f$ is the steered angle of the forward wheels, and $h$ is a proportional constant.

The rearward wheels are steered in the same direction as that of the forward wheels as shown in FIGS. 3 and 4 while the vehicle is moving at a high speed. It is preferable while the vehicle is moving at a low speed to steer the rearward wheels in a direction opposite to the direction in which the forward wheels are steered in order to reduce the radius of curvature of a curve along which the vehicle is to travel. Stated otherwise, the steering wheel is turned through a small range of angles while the vehicle is moving at a high speed, and through a wide range of angles while the vehicle is moving at a low speed. It is therefore preferable to steer the rearward and forward wheels in the same direction when the steering angle is small, and in opposite directions when the steering angle is large.

With the embodiment shown in FIG. 1, the rearward wheels are steered by the drive means based on a signal indicative of a detected lateral acceleration or yaw rate produced on the vehicle while the latter is turning, reducing the delay in response of the rearward wheels to the forward wheels. The rearward wheels can follow a normal circular motion of the vehicle in a short period of time, resulting in an improved degree of responsiveness with which the vehicle can change its direction after the steering wheel has been turned.

Electronically controlled steering systems of the present invention are not limited to the embodiment shown in FIG. 1. For example, the rearward wheels 7, 7 may be steered based on a signal indicative only of an angular displacement of the steering column, or on a signal indicative of a straight-line movement of the forward wheel tie rod 4 or movements of other parts ganged with the tie rod 4. As an alternative, the rearward wheels 7, 7 may be steered based on a signal from means for detecting a turning motion of the vehicle other than a lateral acceleration or yaw rate thereof.

Figure 5:
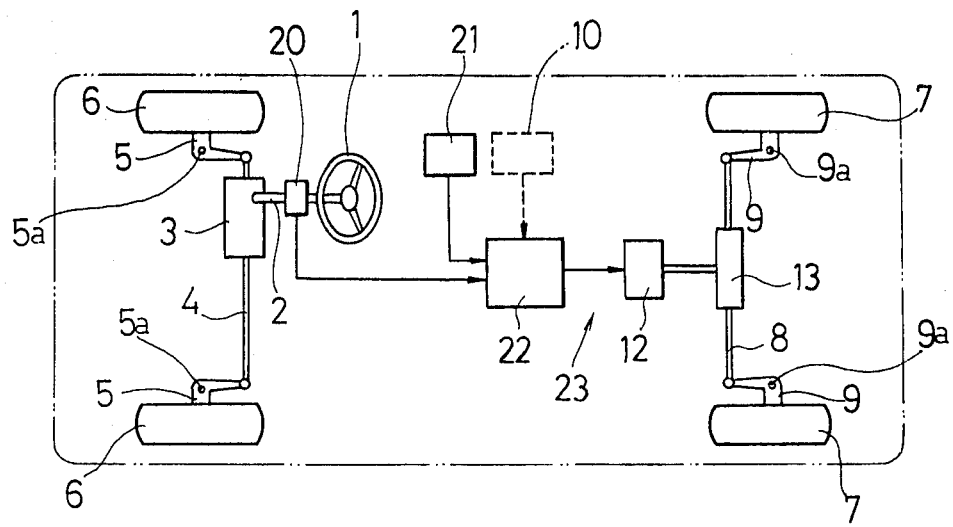
FIG. 5 is a schematic plan view of a motor vehicle incorporating a steering system according to still another embodiment.
Figure 6:
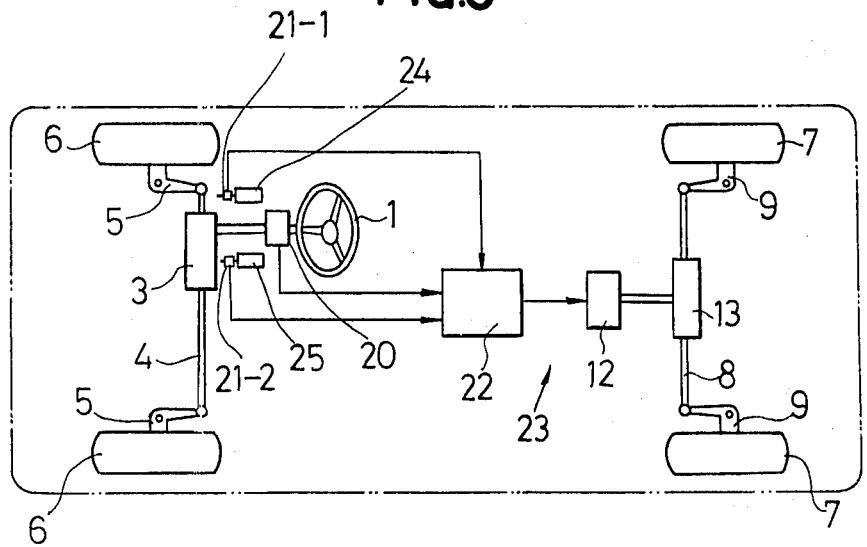
FIG. 6 is a schematic plan view of a motor vehicle incorporating a steering system according to a modification of the embodiment of FIG. 5.

FIGS. 5 and 6 show steering systems according to other embodiments in which rearward wheels can be steered based on signals indicative of a turning motion of a vehicle and of acceleration or deceleration of the vehicle. Identical parts in FIGS. 5 and 6 are denoted by identical reference characters in FIG. 1.

The steering system illustrated in FIG. 5 comprises a sensor 20 for detecting an angle through which a steering wheel 1 is turned, a sensor 21 for sensing acceleration or deceleration of a vehicle, a control computer 22 supplied with electrical signals from the detector 20 and the sensor 21, a servo actuator 12 such as a motor controlled by the computer 22, and a gear box 13 for converting power from the actuator 12 into a straight-line motion of a tie rod 8 through a motion conversion mechanism such as a rack and pinion; the computer 22, actuator 12, and gear box 13 jointly constituting a drive means 23 for steering rearward wheels 7, 7. The steering angle detector 20 is mounted on a steering column 2 and comprises a potentiometer for supplying the computer 22 with outputs indicative of the direction and extent of a steering angle, that is, the direction in which the vehicle is turned and the radius of curvature of a curve along which the vehicle is to travel.

When the vehicle is turned while moving, such turning motion is detected by the sensor 20, and when the vehicle is accelerated or decelerated, such acceleration or deceleration is sensed by the sensor 21. The computer 22 is responsive to signals from the sensor 20 and the sensor 21 for energizing the actuator 12 which causes the gear box 13 to steer the rearward wheels 7, 7 through the tie rod 8. The direction and extent of a steering angle of the rearward wheels 7, 7 are determined in the computer 22 by the direction and extent of an angle, detected by the sensor 20, through which the steering wheel 1 is turned, and by a degree of acceleration and deceleration sensed by the sensor 21. For example, with a front-wheel-driven motor vehicle, the rearward wheels 7, 7 should be steered in an outward direction opposite to that of the forward wheels 6, 6 when the vehicle is accelerated, and the rearward wheels 7, 7, should be steered in the same inward direction as that of the forward wheels 6, 6 when the vehicle is decelerated. Thus, the radius of curvature of a curve along which the vehicle is to run is prevented from being varied due to acceleration or deceleration of the vehicle, resulting in reduced changes in turning characteristics of the vehicle which would otherwise largely differ from those of the vehicle when moving at a constant speed. The steering system is also advantageous in that when the rearward wheels 7, 7 are steered radially inwardly while the vehicle is turned and decelerated, there is less of a tendency for the vehicle to spin due to sudden braking.

When the vehicle is moving at a constant speed, the steering angle of the rearward wheels can be selected to be $\delta r = k\delta f$ in order to allow a lateral acceleration necessary for causing a turning motion to be imparted to the vehicle. When the vehicle is accelerated or decelerated, the proportional constant k which is a function of vehicle speed may be changed by the computer 22 into a function of acceleration or deceleration.

The steering system as illustrated in FIG. 5 may include a sensor 10 (as shown in FIG. 1) for sensing a lateral acceleration generated on the vehicle while the latter is in a turning motion, and/or for sensing a vehicle speed. A signal from the sensor 10 is sent to the computer 22 for also steering the rearward wheels 7 in response to the lateral acceleration and/or the vehicle speed to more precisely meet actual conditions under which the vehicle is turned.

In FIG. 6, an acceleration and deceleration sensor assembly comprises an acceleration sensor 21-1 attached to an accelerator pedal 24 or other parts ganged therewith and a deceleration sensor 21-2 attached to a brake pedal 25 or other parts ganged therewith, the vehicle being accelerated by actuating the accelerator pedal 24 and decelerated by actuating the brake pedal 25.

With the embodiments shown in FIGS. 5 and 6, the rearward wheels are also steered in response to acceleration or deceleration of the vehicle while the latter is in a turning motion, reducing movements in stroke of suspensions and hence changes in turning characteristics due to variations in over or under steering and camber at the forward and rearward wheels. The driver can therefore easily handle the vehicle while moving along a curve having a desired radius of curvature.

Tests were conducted of vehicles equipped with steering systems according to the present invention. Test results will be described with reference to FIGS. 2A and 2B.

Figure 2A:
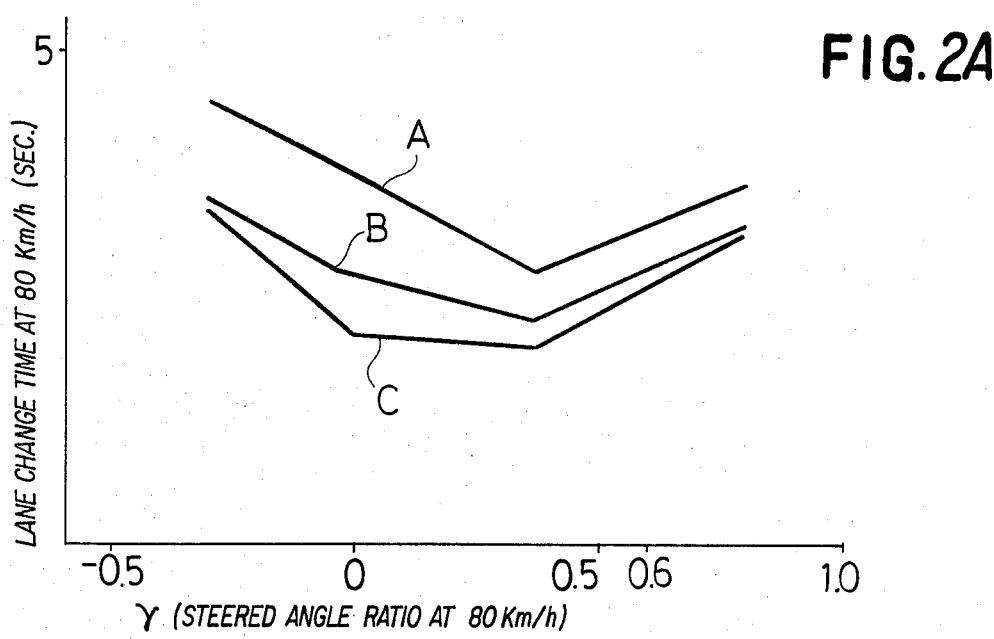
FIGS. 2A and 2B are graphs showing data obtained when vehicles were tested for optimum steering ratios between forward and rearward wheels.

FIG. 2A is illustrative of a graph having an axis of abscissa which indicates steered angle ratios $\gamma$ of rearward wheels to forward wheels and an axis of ordinate which indicates intervals of time T (sec.) required for the vehicle to change lanes spaced 3 meters from each other and to run along a straight line. The steered angle ratio $\gamma$ is zero when the rearward wheels are not steered, is positive when the forward and rearward wheels are steered in the same direction, and is negative when the forward and rearward wheels are steered in opposite directions. The curve A was obtained with the vehicle driven by a driver of little experience, the curve B by a driver having average driving skills, and the curve C by a driver having sophisticated driving skills. The test was carried out with the vehicle moving at a speed of 80 km/h.

In a certain region in which the steered angle ratio is positive, all of the curves A, B, C indicate that the interval of time T is smaller than that of a prior vehicle, that is, the time interval required when $\gamma = 0$, and hence the vehicle can be steered with ease irrespective of the level of driving skill of the driver. The time interval T is at a minimum when $\gamma$ is about 0.37, and will be increased as $\gamma$ becomes larger than 0.37. With respect to the curve B indicative of a typical driver's characteristics, the time interval T at the time of $\gamma$ being about 0.6 takes the same value as when $\gamma = 0$. Thus, it can be seen that the steered angle ratio $\gamma$ in the range of $0 < \gamma \leq 0.6$ is preferable.

The foregoing characteristics start to emerge when the vehicle is moving at a speed of 40 km/h, and become distinct when the vehicle is moving at a speed of 80 km/h. As the vehicle runs faster than 80 km/h, the value of $\gamma$ when T has the same value as when $\gamma = 0$, tends to increase. It is preferable to select $\gamma$ to be in the range of $0 < \gamma \leq 0.6$ when the vehicle runs faster than 80 km/h with the steering system designed to change the range of $\gamma$ dependent on the vehicle speed.

Figure 2B:
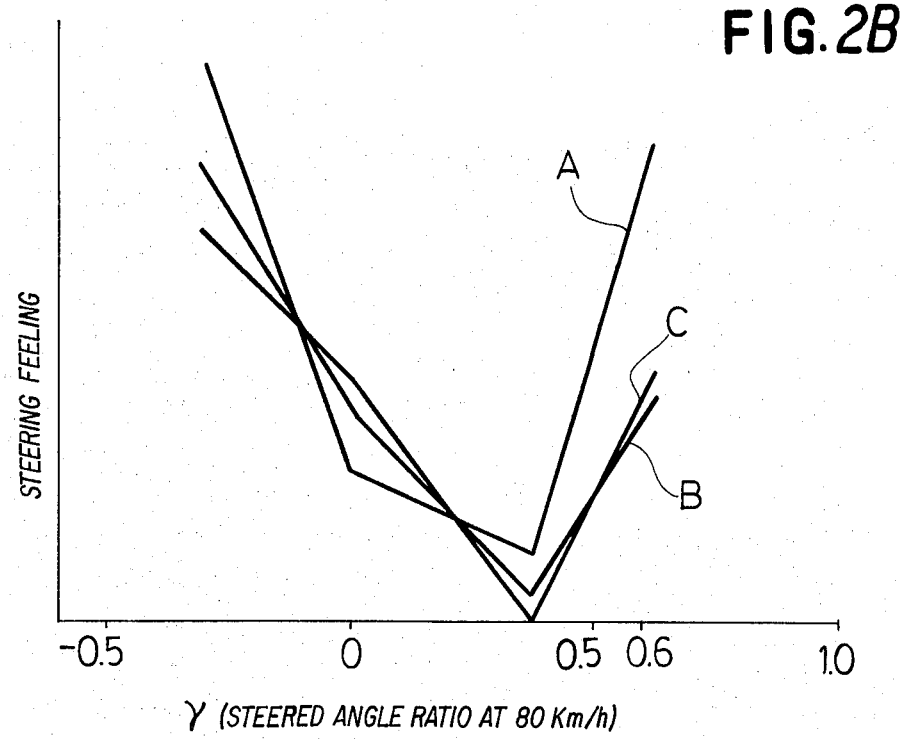

FIG. 2B is a graph indicating degrees of steering feeling F which drivers of different levels of driving skill A, B, C have for the varying steered angle ratios $\gamma$ while driving vehicles at a speed of 80 km/h, the graph having an axis of ordinate indicative of the steering feeling F which becomes progressively better downwardly and worse upwardly. The steering feeling has characteristics that look similar to those of T shown in FIG. 2A. The point at which F is of the same magnitude as it is when $\gamma = 0$ occurs when $\gamma = 0.6$. The test data indicates that the steered angle ratio be preferably selected to be in the range of $0 < \gamma \leq 0.6$.

According to the test data shown in FIGS. 2A and 2B, there is a preferable range of steered angle ratios between forward and rearward wheels as related to vehicle speeds, such a range being advantageous in providing vehicles with efficiently dirigible forward and rearward wheels. The rearward wheels can be steered through an angle which is responsive to the driver's actual steering operation.

What is claimed is:

1. A steering system for a motor vehicle having rearward steered wheels, comprising:
   a sensor for sensing at least a turning motion of the vehicle;
   drive means responsive to a signal from said sensor for steering the rearward wheels; and
   wherein the steered angle ratio $\gamma$ of the rearward wheels to forward wheels of the motor vehicle is selected to be in the range of $0 < \gamma \leq 0.6$ when the vehicle is moving at a speed of 80 km/h or higher, so as to provide optimal steering operation characteristics.

2. A steering system according to claim 1, wherein: said sensor comprises a sensor for sensing a lateral acceleration or yaw angular velocity.

3. A steering system according to claim 1, wherein: said sensor comprises a combination of a steering angle sensor and a sensor for sensing a lateral acceleration or yaw angular velocity.

4. A steering system according to claim 1, wherein: said sensor comprises a combination of a steering angle sensor and an acceleration and deceleration sensor.

5. A steering system according to claim 4, further including a vehicle speed sensor.

6. A steering system according to claim 4 or 5, further including a lateral acceleration or yaw rate sensor.

7. A steering system according to claim 1, 2, 3 or 4, wherein: said drive means comprises a computer for processing signals from said sensor and an actuator controllable by said computer.

* * * * *